Patented Oct. 25, 1932

1,884,889

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.   Application filed February 15, 1929.   Serial No. 340,338.

This invention relates to anti-oxidants for rubber, and to the process of making the same, particularly to improved anti-oxidants of the secondary aromatic amine type and the process by which they are prepared.

It is well known that rubber normally deteriorates when exposed to light, heat or air, its tensile strength, resiliency and other desirable properties suffering as a consequence. Heretofore numerous "age-resisters" or "anti-oxidants" such as aldehyde-amine derivatives and secondary aromatic amines have been proposed and used with considerable success in retarding such deterioration.

This invention, in brief, comprises making an improved anti-oxidant for rubber or similar materials by reacting an amino-substituted phenol with an aromatic amine in the presence of a catalyst. In its preferred form, the method of this invention comprises heating the hydrochloride of an aminophenol with the hydrochloride of an aromatic amine, the hydrogen chloride acting as a catalyst and promoting the condensation of the molecules with the elimination of ammonia or water, but substantially the same product is obtained if the bases are mixed and hydrochloric acid, or even another strong acid such as hydrobromic acid, added thereto. Under certain conditions the reaction may also be carried out in the presence of iodine or other catalyst, or in solution, but in general the procedure is simpler if the two reacting materials are heated together in the presence of substantial proportions of hydrochloric acid.

The process of this invention will be described with reference to a specific embodiment, but it will be understood that other like reacting materials may be substituted or that different proportions or conditions may be employed for the reaction.

Aniline hydrochloride is mixed with p-aminophenol hydrochloride in approximately the proportions of two molecular equivalents of the aniline salt to one molecular equivalent of the p-aminophenol salt, and the mixture is heated under a reflux condenser for 2 to 10 hours at a temperature of about 250° C. The product is poured into water. The insoluble precipitate is separated and washed. This material may be resinous or crystalline, depending upon conditions, and is an excellent anti-oxidant, in rubber. The reactions taking place are rather complex, but the two following equations are typical of what occurs during the reaction:

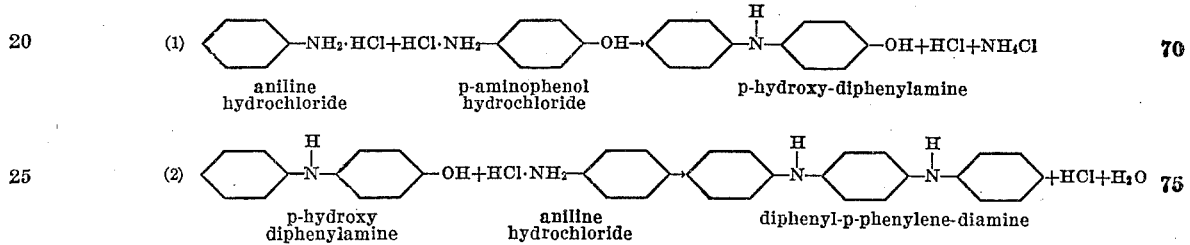

tuted phenol with an aromatic amine in the presence of a catalyst. In its preferred form, the method of this invention comprises heating the hydrochloride of an aminophenol with the hydrochloride of an aromatic amine, the hydrogen chloride acting as a catalyst and promoting the condensation of the molecules with the elimination of ammonia or water, but substantially the same product is obtained if the bases are mixed and hydrochloric acid, or even another strong acid such as hydrobromic acid, added thereto. Under certain conditions the reaction may also be carried out in the presence of iodine or other catalyst, or in solution, but in general the procedure is simpler if the two reacting materials are heated together in the presence of substantial proportions of hydrochloric acid.

Other similar reactions take place among the aniline, the p-aminophenol, and the intermediate products. Among the products of the reaction are found:

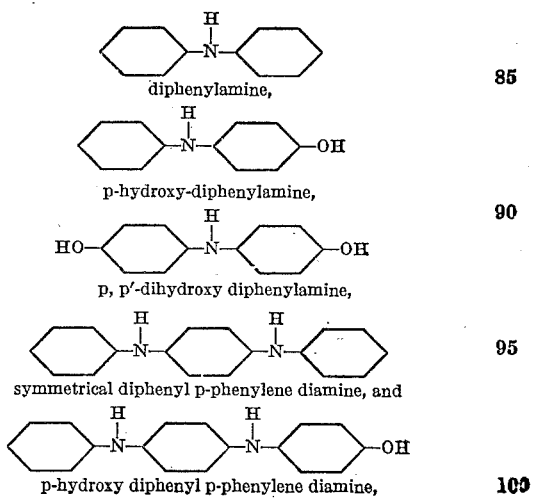

as well as other compounds of similar constitution, but with a more complex molecule.

The complex mixture of products formed by the reaction of p-aminophenol hydrochloride and aniline hydrochloride is very difficult to separate into its individual constituents, but the separation is neither necessary nor desirable, inasmuch as the constituent products are each and all excellent anti-oxidants and the mixture presents certain advantages over the pure substances from the point of view of activity, solubility in rubber, etc.

The process of this invention may be carried out with widely different proportions of the reacting materials. A change in the proportions results in the formation of different proportions of the various products described above. Since these products are all extremely active age-resisters, it is ordinarily of little importance which one or ones predominate. For example, if p-aminophenol is present in excess, a comparatively large proportion of hydroxy-substituted secondary amines is formed, while if aniline is present in larger amounts the diphenylamine, and especially the diphenyl-p-phenylene diamine, tends to predominate. Thus, if one molecular equivalent of p-aminophenol hydrochloride is heated with four or more molecular equivalents of aniline hydrochloride a good yield of diphenyl p-phenylene diamine is obtained. The pure material may be isolated by neutralizing and steam distilling the unreacted excess aniline and crystallizing the residual portion of the product from a convenient solvent, such as toluene.

To illustrate the exceedingly small effect produced by a change in the proportions of the reacting materials, one molecular equivalent of p-aminophenol hydrochloride was heated respectively with two and with four molecular equivalents of aniline hydrochloride, the products being termed A and B.

A typical tire tread composition was prepared containing: blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. This was divided into three portions, one of which was used as a control. To the others were added respectively 0.95 parts (0.5% of the weight of the composition) of anti-oxidants A and B prepared as described above. The compositions were thoroughly mixed, and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. In the table below T indicates ultimate tensile strength in lbs. per sq. in. and E indicates ultimate elongation in per cent. of original length.

*Accelerated aging tests*

| Anti-oxidant (0.5%) | Before aging | | After 7 days in the Geer oven | | After 48 hours in the Bierer-Davis bomb | |
|---|---|---|---|---|---|---|
| | T | E | T | E | T | E |
| None (control) | 4006 | 647 | 1930 | 427 | 896 | 365 |
| A | 4013 | 657 | 3405 | 567 | 2985 | 570 |
| B | 3978 | 627 | 3476 | 586 | 3071 | 580 |

It is evident that the two anti-oxidants A and B are extremely effective in retarding the deterioration of rubber, and that they possess substantially the same activity.

Very similar products with equally good anti-oxidant properties may be obtained by reacting a substituted aminophenol such as 5-aminocresol-2, etc. with a primary aromatic amine. Likewise, other primary aromatic amines, such as the toluidines, the xylidines, the chlorinated anilines, amino-biphenyl, naphthylamine, p-aminodimethylaniline, etc., may be substituted for the aniline. Aminophenols in which the amino group and the hydroxy group are in the ortho or meta position with respect to one another are also included within the broad scope of this invention, but in general the products prepared from the paracompounds will be found to have more desirable anti-oxidant powers.

It is to be understood that the term "treating" as employed in the appended claims is used in a generic sense to include either the incorporation of the age-resisters into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers, and like products, whether or not admixed with fillers, pigments, vulcanizing agents, etc.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises reacting an aminophenol with a primary aromatic amine with the elimination of both water and ammonia, and treating rubber with the product.

2. The method of preserving rubber which comprises reacting an aminophenol with a primary aromatic amine in the presence of a catalyst which promotes the condensation of both the materials with the elimination of water and ammonia, and treating rubber with the product.

3. The method of preserving rubber which comprises reacting an aminophenol with a primary aromatic amine in the presence of a catalyst selected from the class comprising iodine, hydrochloric acid and hydrobromic acid, and treating rubber with the product.

4. The method of preserving rubber which comprises reacting an aminophenol with a primary aromatic amine in the presence of hydrochloric acid, and treating rubber with the product.

5. The method of preserving rubber which comprises reacting a p-aminophenol with a primary aromatic amine in the presence of hydrochloric acid, and treating rubber with the product.

6. The method of preserving rubber which comprises heating p-aminophenol hydrochloride with the hydrochloride of a primary aromatic amine, and treating rubber with the product.

7. The method of preserving rubber which comprises heating p-aminophenol hydrochloride with the hydrochloride of a base selected from the class comprising aniline and its substitution products, and treating rubber with the product.

8. The method of preserving rubber which comprises heating p-aminophenol hydrochloride with aniline hydrochloride, and treating rubber with the product.

9. The method of preserving rubber which comprises heating one molecular equivalent of p-aminophenol hydrochloride with from one-half to five molecular equivalents of aniline hydrochloride, and treating rubber with the product.

10. The method of preserving rubber which comprises heating a mixture of one molecular equivalent of p-aminophenol hydrochloride and from one-half to five molecular equivalents of aniline hydrochloride to a temperature of from 200° to 300° C., and treating rubber with the product.

11. An age-resisting rubber composition comprising rubber and an anti-oxidant resulting from the reaction of an aminophenol and a primary aromatic amine with the elimination of both water and ammonia.

12. An age-resisting rubber composition comprising rubber and an anti-oxidant resulting from the reaction of an aminophenol and a primary aromatic amine in the presence of a catalyst which promotes the condensation of the materials with the elimination of both water and ammonia.

13. An age-resisting rubber composition comprising rubber and an anti-oxidant resulting from the reaction of an aminophenol and a primary aromatic amine in the presence of hydrochloric acid.

14. An age-resisting rubber composition comprising rubber and an anti-oxidant resulting from the reaction of a p-aminophenol and a primary aromatic amine in the presence of hydrochloric acid.

15. An age-resisting rubber composition comprising rubber and an anti-oxidant resulting from the reaction of p-aminophenol hydrochloride and the hydrochloride of a primary aromatic amine.

16. An age-resisting rubber composition comprising rubber and an anti-oxidant resulting from the reaction of p-aminophenol hydrochloride and aniline.

17. An age-resisting rubber composition comprising rubber and an anti-oxidant resulting from the reaction of one molecular equivalent of p-aminophenol hydrochloride with from one-half to five molecular equivalents of aniline hydrochloride.

18. An age-resisting rubber composition resulting from the vulcanization of a mixture comprising rubber, a vulcanizing agent, an accelerator of vulcanization, and an anti-oxidant resulting from the reaction of p-aminophenol hydrochloride and the hydrochloride of a primary aromatic amine.

In witness whereof I have hereunto set my hand this 13th day of February, 1929.

WALDO L. SEMON